(No Model.)  2 Sheets—Sheet 1.

A. G. NEVILLE.
REVOLVING MOLD FOR GLASSWARE.

No. 443,403.  Patented Dec. 23, 1890.

(No Model.) 2 Sheets—Sheet 2.
A. G. NEVILLE.
REVOLVING MOLD FOR GLASSWARE.
No. 443,403. Patented Dec. 23, 1890.
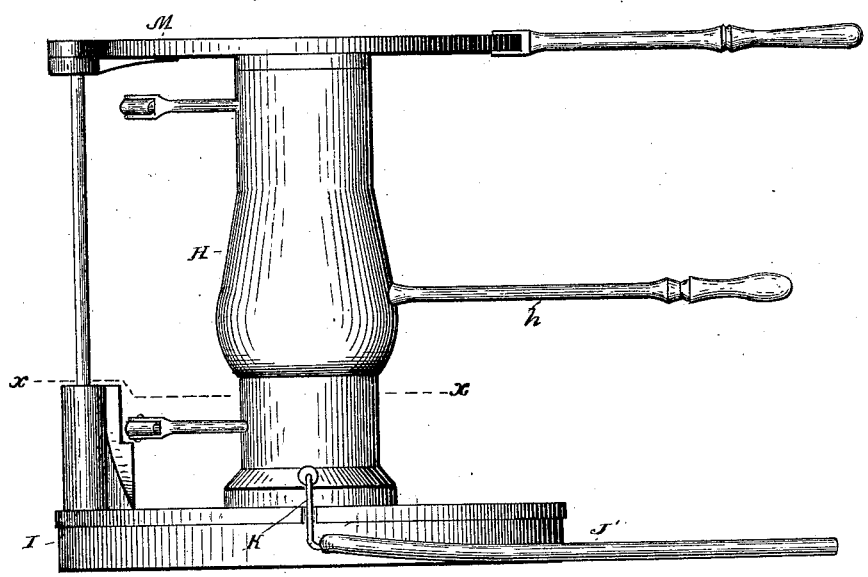
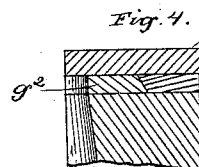
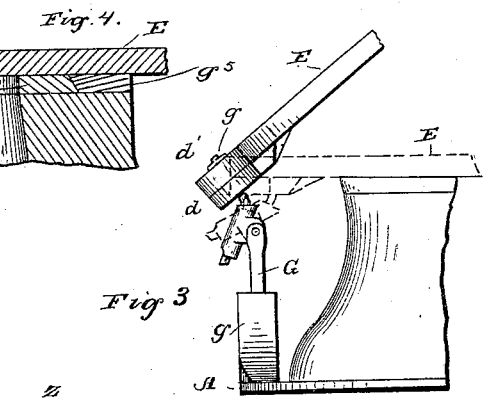
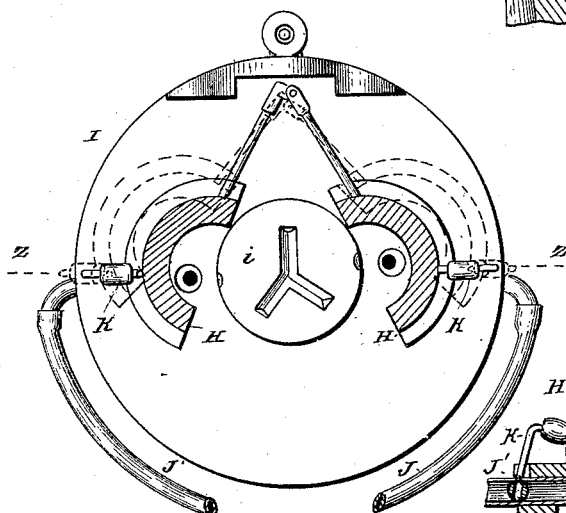
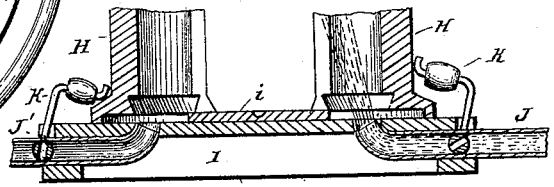
ATTEST.
Victor J Evans
Van Buren Hillyard.
INVENTOR.
Asa G. Neville
By R.S. & A.P. Lacey
Attys.

UNITED STATES PATENT OFFICE.

ASA G. NEVILLE, OF LAZEARVILLE, WEST VIRGINIA.

REVOLVING MOLD FOR GLASSWARE.

SPECIFICATION forming part of Letters Patent No. 443,403, dated December 23, 1890.

Application filed September 10, 1889. Serial No. 323,548. (No model.)

*To all whom it may concern:*

Be it known that I, ASA G. NEVILLE, a citizen of the United States, residing at Lazearville, in the county of Brooke and State of West Virginia, have invented certain new and useful Improvements in Revolving Molds for Glassware; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to molds for making glassware.

The object of the invention is to devise a mold for manufacturing glass articles of a given size without seams and with a uniform luster, and has special reference to the making of hollow blown glassware—such as shades, lamp-chimneys, lamps with or without feet, punch-tumblers, or stem ware, bottles, or any fine glassware—without seams or joints appearing thereon.

The present process of making seamless glassware by the paste-mold process is slow and requires skilled labor, thereby greatly adding to the cost of such articles. The chief difficulties are obviated by this invention and the work facilitated to such an extent that one man in the same time and under like conditions can perform about as much work again as under the present practice and with less attendance.

Under the present system of blowing glass in the paste or wooden mold the glass-blower places the glass in the mold, and after the attendant closes the mold the blower begins to turn his pipe and blow gradually until the piece of glass is blown out against the sides of the mold. The article being shaped, the blower must stand and hold the glass until it cools sufficiently, when he passes it on to another man, who cuts the article from the pipe.

My invention aims to dispense with the extra man required under the old system to cut the ware off from the pipe, makes the ware more uniform, cools the mold automatically, and increases the output in the same space of time.

The improvement consists of the novel features which will be hereinafter more fully described and claimed, and which are shown in the annexed drawings, in which—

Figure 1:
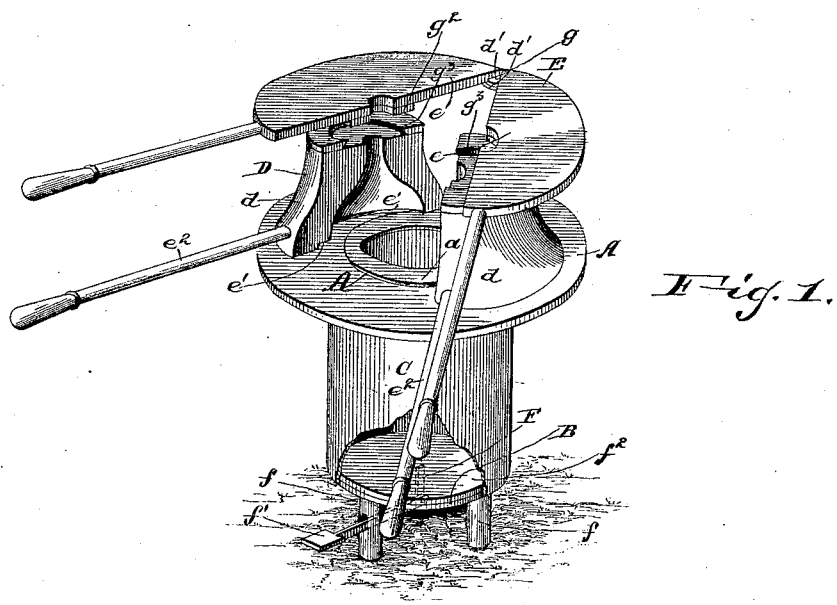
Figure 2:
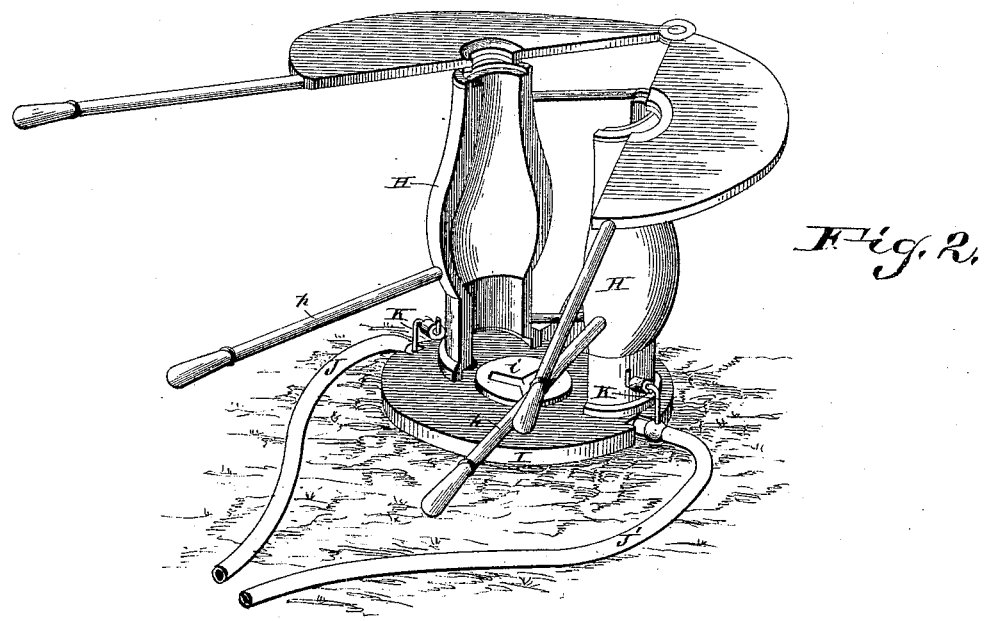

Figure 1 is a perspective view, parts being broken away, of a mold embodying my invention. Fig. 2 is a perspective view, parts being broken away, of a mold, showing modifications and the addition of spray-pipes. Fig. 1$^a$ is a side view of the mold shown in Fig. 2. Fig. 2$^a$ is a horizontal section on the line X X of Fig. 1$^a$, showing the operation by dotted lines. Fig. 3 is a side view showing the cover or top thrown up. Fig. 4 is a detail section showing the dovetail joint between the top or cover and the revoluble part of the mold. Fig. 5 is a detail section on the line Z Z of Fig. 2$^a$.

Referring to Fig. 1, the mold is shown as comprising the bottom B, the top A, having the undercut flange $a$, the body center portion C, the oscillatory center D, and the cover E. The parts are made of suitable material, such as are generally employed in the construction of molds for glass-blowers, and the middle or oscillatory portion D is coated with any of the well-known paste compositions. The mold is supported at a distance from the floor, preferably on the feet $f$, to permit a free working of the vertical rod F, which is connected with the foot-lever $f$ and with the false bottom $f^2$, so that a pressure on the outer end of the lever $f'$ will effect a corresponding elevation of the inner end of the lever and a rise of the false bottom to lift the article from the center of the mold, which in this case is closed. The oscillatory portion D is made in two halves $d$ and $d$, which have an undercut recess $e'$ at their lower end to fit over the flange $a$ on the top A, the halves $d\,d$ being operated by suitable handles $e^2$. The cover E is made in two halves $e\,e$, which have rear projections $d'\,d'$, that are pivotally connected by the pin $g$, that is hinged to the standard G, which is journaled in the block $g'$. The cover can be thrown back and turned to either side. Oscillatory portion D forms a continuation of the portion C of the mold and is designed to form the neck portion on bottles. The cover E is centrally operated to admit the blowpipe, the opening being formed by notches in the meeting edges of the halves $e\,e$. The cover is held down by the rim or raised portion $g^2$ on the under side of the cover, having its edge flared outwardly and embraced by corresponding beveled edges of the recess $g^3$ in the upper end of the revoluble portion D.

In Fig. 2 the central portion of the mold is composed of two parts H H, which are hinged together, and which are provided with handles $h$ $h$, by means of which they are operated. The base I is provided with a central block $i$, which fits within the bottom of the mold. This bottom may be deeply indented and fixed to the base to hold the article against rotation when the central part of the mold is turned back and forth. The cover is similar to the cover E, and is operated in precisely the same manner. The water or spray pipes J J' are placed on diametrically-opposite sides of the base, the one a little in advance of the other, and are so disposed that the jet of water from each will wet the interior of the halves of the mold when opened. The valve-stems K are weighted or otherwise constructed to maintain the valves in a closed condition when not operated on by other forces to hold the said valves open. These valve-stems are arranged within the path of the halves H H of the mold to be struck by the said halves when opened, whereby the pipes J J' are opened and the water sprayed on the interior of the mold.

The operation of the mold is as follows: The pipe, with the glass attached, (not shown), is placed in the mold and the article blown in the usual manner. To prevent seams, the revoluble portion of the mold is turned back and forth, the pipe and article being held stationary until the blowover has been burst. The mold-boy then opens the mold and takes out the piece of ware just made. Opening a little farther, the spray-valves K K are opened, the mold is wet, and the mold is ready for the repetition of the operation.

Having thus described my invention, what I claim as new, and desire to secure by Letters Patent, is—

1. A glass-mold having fixed end portions and an oscillatory intermediate or center portion, substantially as described.

2. The combination, with the glass-mold and the standard, of the two-part cover hinged together by the pin, which in turn is hinged to the said standard, substantially as described.

3. The combination, with a glass-mold, of an oscillatory portion D and a two-part cover E, substantially as and for the purpose described.

4. The combination, with the glass-mold having separable parts, of spray-pipes having their valve-stems adapted to be operated by the said movable or separable parts, substantially as described.

5. The combination, with the glass-mold having movable parts, of the spray-pipes having automatically-closing valves, the valve-stems being projected within the path of said movable parts to be struck thereby when opened, substantially as and for the purpose described.

In testimony whereof I affix my signature in presence of two witnesses.

ASA G. NEVILLE.

Witnesses:
F. H. BIRD,
JOHN E. REESE.